United States Patent [19]

Narula et al.

[11] Patent Number: 4,803,233

[45] Date of Patent: Feb. 7, 1989

[54] WATER-BASED SILICONE-ORGANIC POLYMER COMPOSITIONS AND METHOD THEREFOR

[75] Inventors: Dipak Narula, Midland; Terence J. Swihart, Essexville, both of Mich.

[73] Assignee: Dow Corning Corporation, Midland, Mich.

[21] Appl. No.: 115,493

[22] Filed: Oct. 30, 1987

[51] Int. Cl.$^4$ .............................................. C08K 50/07
[52] U.S. Cl. ...................................... 524/58; 524/306; 524/315; 524/366; 106/287.13; 106/287.14; 525/453; 525/440; 525/446
[58] Field of Search ................. 524/366, 306, 58, 315; 106/287.13, 287.14; 525/453, 440, 446

[56] References Cited

U.S. PATENT DOCUMENTS

| 4,423,095 | 12/1983 | Blizzard | 427/387 |
| 4,501,619 | 2/1985 | Gee | 106/287.14 |
| 4,518,727 | 5/1985 | Traver | 106/287.13 |

Primary Examiner—Melvyn I. Marquis
Attorney, Agent, or Firm—George A. Grindahl

[57] ABSTRACT

Aqueous, organic polymer compositions, such as urethane- or acrylic-based coating compositions, can be improved with respect to strength, adhesion, anticorrosion and/or hardness by mixing them with certain aqueous, silicon compound emulsion compositions. For example, silicone resin emulsions provide improved corrosion resistance for urethane coating compositions. The aqueous, silicon compound emulsion composition comprises a primary, a secondary and a tertiary surfactant.

24 Claims, No Drawings

WATER-BASED SILICONE-ORGANIC POLYMER COMPOSITIONS AND METHOD THEREFOR

BACKGROUND OF THE INVENTION

The present invention relates generally to silicone-organic polymer compositions and to a process for their preparation. More specifically, the present invention relates to a process for modifying water-based organic polymer compositions with a silicone polymer and to the silicone-organic polymer compositions obtained therefrom.

Blizzard, U.S. Pat. No. 4,423,095, discloses silicone-organic coating compositions consisting essentially of a homogeneous mixture of certain silicone resins, one or more silicon-free, film-forming organic polymers and a compatibilizing liquid. The organic polymer can be a water-soluble material, such as poly(vinyl alcohol) or poly(acrylic acid), or water-dispersed material, such as poly(methyl methacrylate) or poly(vinyl acetate). The compatibilizing liquid can be water or an organic liquid, as desired. The silicone resin is said to be the reaction product of a liquid organohydrogenpolysiloxane and a resinous copolymeric siloxane containing silicon-bonded hydroxyl radicals and consisting essentially of $R_3SiO^{1/2}$ units and $SiO_{4/2}$ units. Blizzard further states that the silicone resin contains silicon-bonded hydrogen and/or hydroxyl radicals which provide chemical reactivity for the resin.

U.S. Application Ser. No. 912,020, dated Sept. 26 1986, copending and coassigned with this application for U.S. patent and entitled "Emulsification Process and Emulsions Therefrom", discloses a method for emulsifying high-viscosity silicone fluids, gums and resins which method and emulsions are used in the present invention.

BRIEF SUMMARY OF THE INVENTION

It is an object of the present invention to provide a method for preparing silicone-organic polymer compositions. It is a particular object of the present invention to provide a method for advantageously modifying a water-based organic polymer with a resinous silicone polymer.

These objects and others which will occur to one skilled in the emulsion art upon considering the following disclosure and appended claims, are obtained by the present invention which, generally stated, comprises mixing a unique silicone-in-water emulsion composition with an aqueous composition comprising the organic polymer. In a preferred embodiment the silicone is an alkoxy functional silicone resin.

The silicone-in-water emulsion composition that is used in the process of this invention contains three surfactants.

The alkoxy silicone-organic polymer compositions of this invention are prepared by the process of this invention which comprises mixing a particular alkoxy silicone-in-water emulsion containing three surfactants with an aqueous, organic polymer composition.

DETAILED DESCRIPTION OF THE INVENTION

The present invention relates to a process for preparing a silicone-organic polymer composition, and to compositions obtained therefrom, said process comprising mixing components comprising (A) an aqueous, silicon compound emulsion composition and (B) an aqueous, organic polymer composition to provide a silicone-organic polymer composition wherein the weight ratio of said silicon compound to said organic polymer has a value of from 1/100 to 100/1, said aqueous, silicon compound emulsion composition comprising (i) an aqueous phase consisting essentially of at least 10 parts by weight of water and (ii) an oil phase consisting essentially of 100 parts by weight of a silicon compound having the average formula $R_aSiO_{(4-a)/2}$ wherein each R denotes a monovalent, silicon-bonded radical selected from the group consisting of the hydrogen atom, alkoxy radicals, hydroxy radicals, hydrocarbon radicals and substituted hydrocarbon radicals, the substituents of which are selected from radicals containing one or more atoms selected from the group consisting of nitrogen, oxygen, sulfur and halogen, there being at least one R radical per molecule of said silicon compound selected from the group consisting of hydroxy radicals and alkoxy radicals; a has a value of from 1 to 4; and said aqueous phase and/or said oil phase further containing, in total, (1) at least 3 millimols of a nonionic primary surfactant having an HLB number of from 13 to 15, (2) from 1 to 5 millimols, per millimol of said nonionic primary surfactant, of a nonionic secondary surfactant having an HLB number of from 7 to 9 and (3) at least 0.05 millimol of a nonionic tertiary surfactant having an HLB number of at least 16.

The present invention further relates to a silicone-organic polymer composition comprising 100 parts by weight of a silicon compound having the average formula $R_aSiO_{(4-a)/2}$ wherein each R denotes a monovalent, silicon-bonded radical selected from the group consisting of the hydrogen atom, alkoxy radicals, hydroxy radicals, hydrocarbon radicals and substituted hydrocarbon radicals, the substituents of which are selected from radicals containing one or more atoms selected from the group consisting of nitrogen, oxygen, sulfur and halogen. there being at least one R radical per molecule of said silicon compound selected from the group consisting of hydroxy radicals and alkoxy radicals, and a has a value of from 1 to 4: from 1 to 10.000 parts by weight of an organic polymer; at least 0.05 millimol of a nonionic tertiary surfactant having an HLB number of at least 16; at least 3 millimols of a nonionic primary surfactant having an HLB number of from 13 to 15; from 1 to 5 millimols, per millimol of said primary surfactant, of a nonionic secondary surfactant having an HLB number of from 7 to 9; and more than 10 parts by weight of water.

The aqueous, silicon compound emulsion compositions that are used in the process of this invention, comprise a silicon compound having the formula (I).

$$R_aSiO_{(4-a)/2} \qquad (I)$$

Each R in formula (I) denotes, independently, a monovalent, silicon-bonded radical selected from the group consisting of the hydrogen atom, alkoxy radicals, hydroxy radicals, hydrocarbon radicals and substituted hydrocarbon radicals. Preferably silicon compound (I) contains at least one R radical per silicon atom that is bonded by a silicon-carbon bond.

R can be any monovalent hydrocarbon radical, suitable examples of which include alkyl radicals, such as methyl; ethyl, isopropyl, isobutyl, hexyl, octyl, dodecyl and octadecyl; alkenyl radicals, such as vinyl, allyl and cyclohexenyl; and aryl radicals, such as phenyl, benzyl and tolyl. In a preferred embodiment of this invention the hydrocarbon radicals are methyl or a mixture of methyl and phenyl radicals.

R can also be any substituted monovalent hydrocarbon radical, suitable examples of which include haloalkyl radicals, such as chloropropyl and 3.3.3-trifluoropropyl; sulfur-containing radicals, such as mercaptopropyl; amine-substituted radicals, such as beta-aminoethylamine- substituted alkyl radicals and their partially or fully acylated derivatives; epoxy-substituted alkyl radicals such as glycidoxypropyl; and carboxyalkyl radicals such as carboxyethyl, carboxypropyl, carboxybutyl and S- carboxymethylmercaptoethyl and their various ester derivatives.

R can be any radical selected from hydroxy radicals and alkoxy radicals, examples of which include methoxy, ethoxy and isopropoxy; alkoxyalkoxy, such as methoxyethoxy, methoxyisopropoxy and ethoxyethoxy. At least one R radical per molecule of silicon compound, on average, must be an alkoxy or hydroxy radical.

Without limiting the present invention by the application of any particular theory thereto we can state that we believe that the reactive silicon-bonded hydroxy radicals and/or hydrolyzable radicals of the silicon compound that are not readily hydrolyzed during the formation of the aqueous silicon compound emulsion. typically alkoxy radicals, provide sites for curing and/or crosslinking in the compositions of this invention which contribute to the unexpected properties of those compositions in their ultimate use. Thus, after the aqueous, silicon compound emulsion composition (A) has been mixed with an aqueous, organic polymer composition (B), said reactive sites are thought to react with each other and/or with available reactive sites on the organic polymer, to provide a silicone-organic interpenetrating polymer network and/or a silicone-organic copolymer, respectively.

In formula (I) the value of a can range from 1 to 4; thereby encompassing silicon compounds ranging from network siloxane resins, wherein the value of a typically ranges from 1 to 1.9, to branched, linear and cyclic siloxanes, wherein the value of a typically ranges from 2 to 3, to silanes wherein the value of a is 4. It is to be understood that the formula (I) is a unit, i.e. empirical, formula and that the silicon compound can contain more than one silicon atom and associated R radicals and oxygen atoms, when the value of a is less than 4.

The silicon compound (I) is preferably a silicone. A silicone, for the purposes of this invention, is a compound having at least two silicon atoms per molecule joined by an oxygen atom and having the average formula (I) wherein R denotes the various radicals delineated above, with the proviso that at least one R radical per silicon atom is bonded by a silicon-carbon bond, and a can range from about 1 to 3. Of course, the silicone must contain at least one hydroxy or alkoxy radical per molecule, as stated above.

A preferred silicone for the process and compositions of this invention is a resinous silicone. By a resinous silicone it is meant herein a silicone that has the above-noted general formula (I) wherein a has a value of from 1.0 to 1.9. preferably from 1.3 to 1.7, and contains significant amounts, such as up to 25% by weight, of silicon-bonded hydroxy and/or alkoxy, typically methoxy, radicals. Said silicon-bonded hydroxy and/or alkoxy radicals are thought to be reactive so that the silicone resin can be converted to a solid form and/or reacted with other components such as silicone fluids and/or liquid organic resins bearing reactive sites.

Silicone resins are well known in the silicone art and need no detailed delineation herein. Briefly, silicone resins are typically prepared by hydrolyzing one or more hydrolyzable organosilanes and, optionally, "bodying", i.e. further condensing, the hydrolyzate to effect the formation of siloxane linkages. The organic groups of the organosilanes can be any of the hydrocarbon or substituted hydrocarbon radicals delineated above; however, they are typically methyl radicals and mixtures thereof with phenyl radicals. For example the methyl and phenyl radicals can be introduced into the silicone resin as various mixtures of dimethylsiloxy units and monophenylsiloxy units. The hydrolyzable radicals of the organosilanes are typically chlorine or methoxy radicals, although other hydrolyzable radicals are sometimes used.

The disclosures of U.S. Pat. Nos. 2,706,190; 2,718,483; 2,718,508; 3,208,961; 3,328,481 and 3,844,992 are incorporated herein to generally teach how to prepare silicone resins suitable for use in the process of this invention.

A preferred silicone resin for use in the process of this invention, not made by the typical hydrolysis method, consists essentially of the reaction product of a polymethylhydrogensiloxane and a trimethylsilylated silica resin. This reaction product is made according to the method of U.S. Pat. No. 4,310,678, which is incorporated herein to show its preparation. Briefly, this reaction product can be prepared by forming a homogeneous mixture having an acid number greater than zero and comprising an organic solvent solution of from 40 to 60 parts by weight of a resinous copolymeric siloxane containing silicon-bonded hydroxy radicals and 40 to 60 parts by weight of a methylhydrogenpolysiloxane and heating the homogeneous mixture to remove substantially all of the organic solvent therefrom. The resinous copolymeric siloxane contains silicon-bonded hydroxy radicals and consists essentially of $(CH_3)_3SiO_{1/2}$ siloxane units and $SiO_{4/2}$ siloxane units wherein the ratio of the former to the latter, on a molar basis, has a value of from 0.6/1 to 0.9/1. The methylhydrogenpolysiloxane contains an average of at least one silicon-bonded hydrogen atom per molecule.

The aqueous, silicon compound emulsion compositions that are used in this invention are prepared, generally, by the method of U.S. patent application Ser. No. 912,020, filed on Sept. 26. 1987 by Narula and assigned to the assignee of this invention. The method of Narula has been found to be applicable for the emulsification of a wide range of silicon compounds. In particular, the method of Narula has been found to provide aqueous silicone resin emulsions from alkoxy-containing silicon compounds wherein a significant portion of the alkoxy radicals remain bonded to silicon atoms in the emulsion. Said U.S. Patent Application is incorporated herein by reference to show generally how to prepare said aqueous, silicon compound emulsions.

More particularly, the method of Narula comprises mixing an oil phase consisting essentially of a silicon compound having the average formula (II) with an aqueous phase in the presence of limited amounts of nonionic primary. secondary and tertiary surfactants, each having a particular HLB number, as hereinafter disclosed.

$$R_bX_cSiO_{(4-b-c)/2} \text{ (II)}$$

By the term oil phase it is meant herein a liquid or semi-solid material such as a freely flowing oligomer or a slowly flowing gum and ranging in viscosity from a few centipoise (millipascal-seconds) to a few kilopascal-seconds or a non-flowing gel. It is only necessary that the oil phase be mixable with other emulsion components, such as surfactants and water, using typical emulsifying means.

R in compound (II) can be any of the radicals delineated above for silicon compound (I) and X can be any hydrolyzable radical. A hydrolyzable radical is any radical which can be removed from a silicon atom by the action of water. Examples of suitable hydrolyzable radicals include halogen, such as chlorine; alkoxy, such as methoxy, ethoxy and isopropoxy; alkoxyalkoxy, such as methoxyethoxy, methoxyisopropoxy and ethoxyethoxy; amino, such as $NH_2$, $NHCH_3$ and $NHSi(CH)_3$; and amido radicals, such as acetamido and N-methylacetamido. Any hydrolyzable radicals that are present in (II) are preferably alkoxy radicals.

The values of b, c, and b+c in formula (II) can range from 0 to 4, 0 to 4 and 1 to 4, respectively; thereby encompassing silicon compounds ranging from network siloxane resins, wherein the value of b+c typically ranges from 1 to 1.9, to branched, linear and cyclic siloxanes, wherein the value of b+c typically ranges from 2 to 3, to silanes wherein the value of b+c is 4. It is to be understood that the above silicon compound formula (II) is a unit, i.e. empirical, formula and that, if desired, the silicon compound can contain more than one silicon atom, and associated R radicals and oxygen atoms, when the value of b+c is less than 4. When c has a value of zero it is necessary that at least one of the R radicals in the formula (II) be an hydroxy or alkoxy radical in order to assure that the resulting silicon compound (I) contains the required hydroxy and/or alkoxy radical.

In the preparation of the aqueous, silicon compound emulsion composition (A) any X radicals of silicon compound (II) are at least partially hydrolyzed to provide silicon compound (I) having silicon-bonded hydroxyl radicals. When X denotes readily hydrolyzable radicals, such as halogen, amine and amide said hydrolysis is thought to be substantially complete. However, when X denotes alkoxy radicals there appears to be an incomplete hydrolysis of silicon compound (II) and the resulting aqueous, silicon compound emulsion composition appears to contain a silicon compound having the formula (I) wherein a significant amount of silicon-bonded alkoxy radicals is present. Of course, in most instances silicon compound (I) will also comprise siloxane bonds which arise from the condensation of silicon-bonded hydroxyl radicals with other silicon-bonded hydroxyl radicals and/or silicon-bonded hydrolyzable radicals in the well known manner.

The process and compositions of this invention incorporate nonionic primary, secondary and tertiary surfactants to aid in the forming, stabilizing and thickening of the aqueous, silicon compound emulsion composition (A).

Nonionic surfactants are well known and need no detailed explanation herein. Nonionic surfactants suitable for use herein are principally of the ethoxylated substrate type wherein the substrate is selected from hydrophobic alcohols, acids, amides, esters and polyoxypropylenes. Suitable surfactants have ES, ESE and SES molecular structures wherein E denotes a polyoxyethylene moiety and S denotes a hydrophobic substrate. The primary, secondary and tertiary surfactants that are used in this invention can be of the same or different type, provided they are nonionic.

The primary surfactant that is used in this invention can be any nonionic surfactant having an HLB number of from 13 to 15; however, it is preferably an ethoxylated alkylphenol such as, for example, octylphenoxypolyethylene oxide containing an average of about 13 ethylene oxide units per molecule and having the CTFA name of octoxynol-13.

The reader is referred to "CTFA Cosmetic Ingredient Dictionary", Third Ed., 1982; the Cosmetic, Toiletry and Fragrance Association, Inc.; Washington, D.C. 20005, hereby incorporated by reference to further delineate the octoxynol nomenclature.

The HLB number of a surfactant is a well-known quantity and needs no explanation herein. The reader is referred to "McCutcheon's Detergents and Emulsifier"; Ridgewood, NJ; Allured Publishing Corp., incorporated herein by reference, for a comprehensive tabulation of surfactants in terms of HLB number, molecular structure, generic name and trade name.

The secondary surfactant that is used in this invention can be any nonionic surfactant having an HLB number of from 7 to 9; however it is preferably an ethoxylated alkylphenol such as, for example, octylphenoxypolyethylene oxide containing an average of about 3 ethylene oxide units per molecule and having the CTFA name of octoxynol-3.

The tertiary surfactant that is used in this invention can be any nonionic surfactant having an HLB number of at least 16; however, it is preferably an ethoxylated saccharide such as, for example, polyethoxylated methyl glucose dioleate containing about 120 ethylene oxide units per molecule and having the CTFA name of PEG-120 methyl glucose dioleate.

The amounts of the primary and secondary surfactants that are used in this invention are related to each other and to the amount of silicon compound that is used. Thus, for every 100 parts by weight of silicon compound (I) at least 3 millimols of primary surfactant is used to prepare the aqueous, silicon compound emulsion composition. Preferably the amount of primary surfactant that is used in this invention will be from 5 to 50 millimols and most preferably from 10 to 25 millimols per 100 parts by weight of silicon compound (I).

Herein the term "millimols" is to be taken in the same sense as the term "parts by weight" is taken. Thus, if the term parts by weight is applied on a gram basis, for example. the term millimol is to be applied on a milligram-mol basis.

The amount of secondary surfactant to be used in this invention is from 1 to 5, preferably 2 to 3, millimols for every millimol of primary surfactant that is used to prepare the aqueous, silicon compound emulsion composition.

In terms of a preferred primary surfactant. i.e., $C_8H_{17}C_6H_4(OCH_2CH_2)_nOH$ wherein n has an average value of 13. and a preferred secondary surfactant, i.e., $C_8H_{17}C_6H_4(OCH_2CH_2)_nOH$ wherein has an average value of 3, the amounts of each to use in this invention are at least 2.3, preferably 3 to 30 and most preferably 7.8 to 19.5. parts by weight of the former and at least 2.2. preferably 3.5 to 35 and most preferably from 11 to 19, parts by weight of the latter.

The amount of the tertiary surfactant that is to be used in this invention is surprisingly small, ranging up from about 0.05 millimol per 100 parts by weight of silicon compound. While the actual upper and lower limits of the amount of tertiary surfactant have not been fully delineated the practical limits thereof appear to be from about 0.05 to about 0.25 millimol per 100 parts by weight of silicon compound (I).

In terms of a preferred tertiary surfactant, i.e., PEG-120 methyl glucose dioleate, the amount to be used in this invention to prepare the aqueous, silicon compound emulsion composition ranges from about 0.3 part by weight, preferably from 0.3 to 1.5 parts by weight for every 100 parts by weight of the silicon compound (I).

In the process and compositions of this invention the amount of water to be used when preparing the aqueous, silicon compound emulsion composition (A) is not narrowly limited provided an aqueous emulsion composition can be formed with the amount of water used. For example, from 10 to 2,000 parts by weight of water for every 100 parts by weight of silicon compound can be used. However, emulsions which are rich in water require longer periods of mixing than emulsions which are rich in silicon compound. Consequently the amount of water to be used in this invention to form the aqueous, silicon compound emulsion composition is preferably limited to less than 350 parts by weight, and most preferably less than 100 parts by weight, per 100 parts by weight of silicon compound. The water that is used in this invention should be clear and clean and preferably has been deionized or distilled.

In those instances wherein the oil phase has a viscosity of greater than 50,000 centipoise at 25° C., it is preferred to limit the amount of water to about 15 to 45 parts by weight, based on 100 parts by weight of silicon compound (I). The aqueous, silicon compound emulsion composition (A) can be diluted with water, if desired. For example, an aqueous, silicon compound emulsion composition containing, for example, 15 parts by weight water can be prepared and then diluted with water to an aqueous, silicon compound emulsion containing as much as 95 percent water.

The aqueous, silicon compound emulsion composition (A) can further comprise nonessential components such as thickeners. biostats, freeze-thaw stabilizers, colorants and odorants which are commonly used in aqueous, silicon compound emulsions.

The aqueous, silicon compound emulsion compositions are prepared by mixing suitable amounts of the above-described silicon compound (II), the primary, secondary and tertiary surfactants and the water and thereafter further processing the mixture to form an emulsion having an average oil particle size of less than about 2 micrometers.

The aqueous, silicon compound emulsion compositions are preferably prepared by mixing an aqueous phase comprising the water and the nonionic tertiary surfactant with an oil phase comprising the silicon compound (II) and the nonionic primary and secondary surfactants. While it is possible to mix the aqueous phase with the oil phase in any manner it is highly preferred to slowly admix the aqueous phase into the oil phase so that the mixture progresses from an oil-out to a water-out mixture. The mixing is conducted until the mixture becomes a water-out emulsion and the desired size of oil particle is obtained.

Any mixing means can be used in the process of this invention provided only that it is capable of intimately mixing the components of the emulsion to be prepared. Examples of suitable mixing means include, but not limited to, impeller mixers, sigma blade dough mixers and planetary mixers.

The aqueous, organic polymer composition (B) that is mixed with the aqueous, silicon compound emulsion composition (A) in the process of this invention can be any waterbased compositions; such as an emulsion, a latex, a dispersion or a solution, which further comprises an organic polymer. The aqueous, organic polymer composition is preferably an oil-in-water type composition wherein the continuous phase comprises water and, most preferably, is dilutable therewith.

The organic polymer can be any of the currently known polymers which are prepared in aqueous form for convenient use, such as for coating, painting and printing. Examples of said organic polymer include, but are not limited to, water- soluble organic polymers, such as poly(vinyl alcohol) and poly(acrylic acid); emulsion-polymerized vinylic polymers, such as poly(styrene-co-butadiene), poly(vinyl chloride), poly(vinyl chloride-co-ethylene), the acrylics, such as poly(methyl methacrylate), and poly(vinyl acetate); and condensation polymers, such as polyurethanes, polyesters, polyamides and polyimides; and others, such as polysulfones.

In a preferred embodiment of this invention the organic polymer is any film-forming organic polymer which finds utility as a component in a coating composition, such as a corrosion-resisting coating composition for metal substrates, such as steel and aluminum. Advantageously, one or more of the film properties of said coating, selected from corrosion resistance, adhesion, tensile strength, elongation, durometer and hardness, will be improved by the process of this invention.

The compositions of this invention typically comprise additional components to aid in the curing of the silicon compound (I) and/or the organic polymer. Examples of suitable cure-aiding components include well known curing catalysts for silicone and/or organic polymers, such as compounds of lead, tin, titanium and zinc.

The process of this invention, and the silicone-organic polymer compositions obtained therefrom, comprises a thorough mixing of the aqueous, silicon compound emulsion composition (A) and the aqueous, organic polymer composition (B). Said mixing can be done by any suitable means and is not a critical aspect of this invention. Suitable mixing means include, for example, the mixing means delineated above for the preparation of the aqueous, silicon compound emulsion composition.

The silicone-organic polymer compositions of this invention can be prepared at room temperature or at elevated temperature, such as up to about 100° C. as desired.

The process of this invention further contemplates the removal of the water from the mixture comprising components (A) and (B) to provide a substantially water-free silicone-organic polymer composition. Removal of said water can be done at ambient or non-ambient conditions, as desired. Typically the coating compositions of this invention are coated onto a substrate and the coating freed of water at elevated temperature to provide a solid silicone-organic polymer composition durable adhered to said substrate.

The following examples are disclosed to further teach how to practice. but not to limit, the present invention which is properly delineated by the appended claims.

All parts and percentages are by weight, unless otherwise stated.

Physical properties of the cured compositions were measured according to ASTM Test Methods. Tensile and elongation were measured on cured coupons, using an INSTRON brand tensiometer available from The Instron Company of Canton, Mass. Hardness was measured on coatings cured onto aluminum and steel panels, using the well known pencil test. Durometer was measured on cured coupons, using a Shore A penetrometer.

Corrosion resistance of a coating was determined by placing "X"-scribed coated metal panels in a salt spray fog chamber at 98° F. until corrosion was observed. The panels were removed from the chamber and visually examined for corrosion every 24 hours.

Coated panels were prepared by flow-coating a coating solution onto a pre-cleaned cold-rolled steel panel by pouring the solution onto the surface of the panel, which was tilted at a 45 degree angle from the vertical, and allowing the excess solution to run off the panel. The resulting coating was allowed to cure at room temperature (R.T.) for about 15 minutes and was then further cured in an air oven at 150° C. for 10 minutes. The cured coating thickness was in the range of about 0.8 to 1.7 mils.

The coated panels were scribed with an "X" near the center of each panel and subjected to salt spray (fog) testing according to ASTM test method B117-73, using a sodium chloride concentration of 5% and a temperature of 98° F. (37° C.). Before placing the coated panels in the salt spray apparatus, the edges of each panel were covered with KAPTON brand polyimide tape, available from The DuPont Company; Industrial Films Division; Wilmington, Del. in order to eliminate edge corrosion effects. After exposure, the panels were rinsed with distilled water before being evaluated.

Corrosion is represented by "undercutting", i.e. propagation of the corrosion boundary beyond the scribe lines, or by loss of film integrity, i.e. isolated sites of corrosion away from the scribe lines. Undercutting of greater than ¼ inch (i.e., total width between corrosion boundaries along the scribe lines) or less than ¼ inch undercutting combined with loss of film integrity was considered 100% corrosion, i.e. a failure.

Adhesion was measured by the well known "Crosshatch" test. In this test a coated panel is scribed with a 1-inch square containing 10×10 cross-scribes to form 100 1/10-inch squares. A piece of 1-inch Scotch brand adhesive tape, available from The 3M Company, St. Paul, MN, is applied with rubbing to the crosshatched area and then peeled off at an angle of 180°. If more than 50 of the 1/10-inch squares are removed from the panel by the tape the adhesive failure is said to be 100%. If 50 or less of the 1/10-inch squares are removed the number so-removed is reported.

EXAMPLES 1-40

These examples illustrate the present invention as practiced with a resinous methylphenylsilicone. An oil phase was prepared by mixing 100 parts of a liquid silicone resin which consisted of 67 mol dimethylsiloxy units, 33 mol % of phenylsiloxy units and 16% silicon-bonded methoxy radicals; 6.5 parts of octoxynol-13 and 6.5 parts of octoxynol-3. An aqueous phase was prepared by mixing 10 parts of a 20% aqueous solution of PEG-120 MGD (polyethoxylated methyl glucose dioleate containing about 120 ethylene oxide units per molecule and having the CTFA name of PEG-120 methyl glucose dioleate) and 9.6 parts of water. The aqueous phase was slowly mixed into the oil phase using an air-driven propeller stirrer to provide an oil-in-water emulsion which was further diluted with 58 parts of water. This silicone-in-water emulsion was mixed in various amounts with various aqueous organic polymer compositions, using a cold process and a hot process. In the cold process the silicone-in-water emulsion and the aqueous organic polymer composition were mixed to homogeneity at room temperature. In the hot process the cold process is followed and then the homogeneous blend is stirred and heated to 70° C. for 30 minutes.

The resulting 40 compositions of this invention, as well as the aqueous oganic polymer compositions containing no added silicone emulsion, were evaluated for mechanical and film properties as described above. The results are set forth in TABLES I-IV. Hot Process compositions have odd Reference Numbers and Cold Process compositions have even Reference Numbers.

In TABLE I it is shown that Urethane IMAB-298A, an organic polymer having a relatively low tensile strength, available from The Dexter Corporation, Midland Division; Waukegan, IL, is significantly improved, as to tensile strength, by the incorporation, by the cold or hot process, of from 1 to 20 percent silicone resin. Additionally, the corrosion resistance of the organic polymer is improved by the addition of from 20 to 30 silicone resin, following the hot process.

In TABLE II and TABLE III it is shown that the corrosion resistance and adhesion to aluminum of PVA #364, available from The DuPont Company. Polymer and Chemicals Division; Wilmington, DE, and ACRYLIC MV-66. available from Rohm and Haas; Philadelphia, PA. respectively, is significantly increased by the incorporation, by the hot or cold process, of from 20 to 30% silicone resin.

TABLE I

| | | \multicolumn{8}{c}{URETHANE IMAB-298A} |
| | | | | | | Coated On Steel | | | |
| | | Tensile | | Elong. | | Hardness | | Corrosn. | | Duro. | |
| Ref. No. | Silicone | Hot | Cold | Hot | Cold | Hot | Cold | Hot | Cold | Hot | Cold |
| Control | 0% | 382 | | 444 | | 4H | | 240 | | 40 | |
| Ex. 1&2 | 1% | 892 | 518 | 451 | 398 | H | 4H | 240 | 240 | 57 | 55 |
| Ex. 3&4 | 5% | 791 | 528 | 467 | 443 | H | 2H | 240 | 240 | 55 | 46 |
| Ex. 5&6 | 10% | 1037 | 606 | 461 | 443 | H | 2H | 240 | 240 | 58 | 52 |
| Ex. 7&8 | 20% | 820 | 599 | 503 | 467 | H | 2H | >240 | 240 | 53 | 45 |
| Ex. 9&10 | 30% | * | 351 | * | 489 | B | HB | >240 | 240 | * | 33 |

*Samples did not cure bubble free in thick section due to the high viscosity of the sample.

TABLE II

PVA #364

| Ref. No. | Silicone | Tensile Hot | Tensile Cold | Elong. Hot | Elong. Cold | Coated On Steel Hardness Hot | Hardness Cold | Corrosn. Hot | Corrosn. Cold | Adhesive Failure* Hot | Failure* Cold |
|---|---|---|---|---|---|---|---|---|---|---|---|
| Control | 0% | 161 | | 557 | | B | | 48 | | 100 | |
| Ex. 11&12 | 1% | 135 | 137 | 503 | 530 | HB | B | 48 | 48 | 100 | 100 |
| Ex. 13&14 | 5% | 97 | 110 | 585 | 560 | HB | 2B | 48 | 48 | 100 | 100 |
| Ex. 15&16 | 10% | 33 | 60 | 635 | 794 | HB | 2B | 48 | 48 | 10 | 0 |
| Ex. 17&18 | 20% | 59 | 31 | 684 | 1005 | HB | 4B | 240 | 240 | 0 | 0 |
| Ex. 19&20 | 30% | ** | ** | ** | ** | 6B | 4B | 240 | 240 | 0 | 0 |

*Values are for adhesive failure from aluminum. All samples had zero adhesive failure from steel.
**Samples did not cure in thick section.

TABLE III

ACRYLIC MV-66

| Ref. No. | Silicone | Tensile Hot | Tensile Cold | Elong. Hot | Elong. Cold | Coated On Steel Hardness Hot | Hardness Cold | Corrosn. Hot | Corrosn. Cold | Adhesive Failure* Hot | Failure* Cold |
|---|---|---|---|---|---|---|---|---|---|---|---|
| Control | 0% | 622 | | 203 | | B | | 48 | | 100 | |
| Ex. 21&22 | 1% | 515 | 558 | 215 | 190 | HB | 3B | 48 | 48 | 100 | 100 |
| Ex. 23&24 | 5% | 603 | 453 | 207 | 174 | HB | 2B | 48 | 48 | 100 | 100 |
| Ex. 25&26 | 10% | 438 | 418 | 239 | 256 | HB | 3B | 48 | 48 | 100 | 100 |
| Ex. 27&28 | 20% | 431 | 463 | 341 | 361 | HB | 3B | 240 | 240 | 50 | 0 |
| Ex. 29&30 | 30% | 345 | 361 | 397 | 394 | 6B | 4B | 240 | 240 | 0 | 0 |

*Values are for adhesive failure from aluminum. All samples had zero adhesive failure from steel.

TABLE IV

URETHANE 0900/W103 (LOT-A)

| Ref. No. | Silicone | Tensile Hot | Tensile Cold | Elong. Hot | Elong. Cold | Coated On Steel Hardness Hot | Hardness Cold | Corrosn. Hot | Corrosn. Cold | Duro. Hot | Duro. Cold |
|---|---|---|---|---|---|---|---|---|---|---|---|
| Control | 0% | 864 | | 410 | | 4H | | | | 58 | |
| Ex. 31&32 | 1% | 335 | 583 | 411 | 371 | 4H | 5H | * | * | 43 | 62 |
| Ex. 33&34 | 5% | 344 | 638 | 425 | 452 | 4H | 4H | * | * | 45 | 55 |
| Ex. 35&36 | 10% | 325 | 880 | 437 | 474 | 4H | 4H | * | * | 33 | 53 |
| Ex. 37&38 | 20% | 354 | 547 | 433 | 495 | 4H | H | * | * | 36 | 45 |
| Ex. 39&40 | 30% | 525 | 421 | 488 | 470 | B | F | * | * | 41 | 36 |

*No significant improvement in corrosion protection beyond Control.

EXAMPLES 41–46

These examples illustrate this invention as practiced with a resinous methylsilicone. An oil phase was prepared by mixing 100 parts of a liquid silicone resin which was the reaction product of equal amounts of trimethylsiloxyterminated poly(methylhydrogen)siloxane and trimethylsiloxyterminated silica resin and was prepared by the method of U.S. Pat. No. 4,310,678; 9.0 parts of octoxynol-13 and 9.0 parts of octoxynol-3. An aqueous phase was prepared by mixing 98 parts of water. 2.0 parts of PEG-120 MGD and 4.85 parts of isopropyl alcohol. The aqueous phase was slowly mixed into the oil phase using an air-driven propeller stirrer to provide an oil-in-water emulsion.

This emulsion was then mixed at room temperature with a different lot of the aqueous urethane that was used in Reference.

TABLE V

URETHANE 0900/W103 (LOT-B)

| Ref. No. | Silicone | Tensile | Elongation | Durometer |
|---|---|---|---|---|
| Control | 0% | 831 | 369 | 85 |
| Ex. 41 | 0.1% | 759 | 392 | 81 |
| Ex. 42 | 0.5% | 783 | 363 | 82 |
| Ex. 43 | 1.0% | 922 | 398 | 81 |
| Ex. 44 | 2.0% | 652 | 423 | 76 |
| Ex. 45 | 5.0% | 606 | 434 | 75 |
| Ex. 46 | 10.0% | 1068 | 468 | 80 |

That which is claimed is:

1. A process for preparing a silicone-organic polymer composition, said process comprising mixing components comprising (A) an aqueous, silicon compound emulsion composition and (B) an aqueous, organic polymer composition to provide a silicone-organic polymer composition wherein the weight ratio of said silicon compound to said organic polymer has a value of from 1/100 to 100/1, said aqueous, silicon compound emulsion composition comprising (i) an aqueous phase consisting essentially of at least 10 parts by weight of water and (ii) an oil phase consisting essentially of 100 parts by weight of a silicon compound having the average formula $R_aSiO_{(4-a)/2}$ wherein each R denotes a monovalent, silicon-bonded radical selected from the group consisting of the hydrogen atom, alkoxy radicals, hydroxy radicals, hydrocarbon radicals and substituted hydrocarbon radicals, the substituents of which are selected from radicals containing one or more atoms selected from the group consisting of nitrogen, oxygen, sulfur and halogen, there being at least one R radical per molecule of said silicon compound selected from the group consisting of hydroxy radicals and alkoxy radicals; has a value of from 1 to 4; and said aqueous phase and/or said oil phase further containing, in total, (1) at least 3 millimols of a nonionic primary surfactant having an HLB number of from 13 to 15,
(2) from 1 to 5 millimols, per millimol of said nonionic primary surfactant, of a nonionic secondary surfactant having an HLB number of from 7 to 9 and
(3) at least 0.05 millimol of a nonionic tertiary surfactant having an HLB number of at least 16.

2. A process according to claim 1 wherein the nonionic primary surfactant is octylphenoxypolyethylene oxide containing an average of about 13 ethylene oxide units per molecule, the nonionic secondary surfactant is octylphenoxypolyethylene oxide containing an average of about 3 ethylene oxide units per molecule, the nonionic tertiary surfactant is polyethoxylated methyl glucose dioleate containing about 120 ethylene oxide units per molecule, R is selected from the group consisting of alkoxy, hydroxy and monovalent hydrocarbon radicals and a has a value of from 1.0 to 1.9.

3. A process according to claim 2 wherein the silicon compound is a silicone resin consisting essentially of dimethylsiloxy units and phenylsiloxy units and the weight ratio of said silicone to said organic polymer has a value of from 5/100 to 25/100.

4. A process according to claim 2 wherein the silicon compound is a silicone resin consisting essentially of the reaction product of a polymethylhydrogensiloxane and a trimethylsilylated silica resin bearing silicon-bonded hydroxy radicals and the weight ratio of said silicone to said organic polymer has a value of from 5/100 to 25/100.

5. A process according to claim 1 wherein the aqueous, organic polymer composition is selected from the group consisting of water-based polyacrylate compositions, water-based poly (vinyl alcohol) compositions and water-based polyurethane compositions.

6. A process according to claim 2 wherein the aqueous, organic polymer composition is selected from the group consisting of water-based polyacrylate compositions, water-based poly (vinyl alcohol) compositions and water-based polyurethane compositions.

7. A process according to claim 3 wherein the aqueous, organic polymer composition is selected from the group consisting of water-based polyacrylate compositions, water-based poly (vinyl alcohol) compositions and water-based polyurethane compositions.

8. A process according to claim 4 wherein the aqueous, organic polymer composition is selected from the group consisting of water-based polyacrylate compositions, water-based poly (vinyl alcohol) compositions and water-based polyurethane compositions.

9. A silicone-organic polymer composition prepared by the process of claim 1.

10. A silicone-organic polymer composition prepared by the process of claim 2.

11. A silicone-organic polymer composition prepared by the process of claim 3.

12. A silicone-organic polymer composition prepared by the process of claim 4.

13. A silicone-organic polymer composition prepared by the process of claim 5.

14. A silicone-organic polymer composition prepared by the process of claim 6.

15. A silicone-organic polymer composition prepared by the process of claim 7.

16. A silicone-organic polymer composition prepared by the process of claim 8.

17. A silicone-organic polymer composition comprising 100 parts by weight of a silicon compound having the average formula $R_aSiO_{(4-a)/2}$ wherein each R denotes a monovalent, silicon-bonded radical selected from the group consisting of the hydrogen atom, alkoxy radicals, hydroxy radicals, hydrocarbon radicals and substituted hydrocarbon radicals, the substituents of which are selected from radicals containing one or more atoms selected from the group consisting of nitrogen, oxygen, sulfur and halogen, there being at least one R radical per molecule of said silicon compound selected from the group consisting of hydroxy radicals and alkoxy radicals, and a has a value of from 1 to 4: from 1 to 10.000 parts by weight of an organic polymer; at least 0.05 millimol of a nonionic tertiary surfactant having an HLB number of at least 16; at least 3 millimols of a nonionic primary surfactant having an HLB number of from 13 to 15; from 1 to 5 millimols, per millimol of said primary surfactant, of a nonionic secondary surfactant having an HLB number of from 7 to 9; and more than 10 parts by weight of water.

18. A silicone-organic polymer composition according to claim 17 wherein the nonionic primary surfactant is octylphenoxypolyethylene oxide containing an average of about 13 ethylene oxide units per molecule, the nonionic secondary surfactant is octylphenoxypolyethylene oxide containing an average of about 3 ethylene oxide units per molecule, the nonionic tertiary surfactant is polyethoxylated methyl glucose dioleate containing about 120 ethylene oxide units per molecule, R is selected from the group consisting of alkoxy, hydroxy and monovalent hydrocarbon radicals and a has a value of from 1.0 to 1.9.

19. A silicone-organic polymer composition according to claim 18 wherein the silicon compound is a silicone resin consisting essentially of dimethylsiloxy units and phenylsiloxy units and the weight ratio of said silicone to said organic polymer has a value of from 5/100 to 25/100.

20. A silicone-organic polymer composition according to claim 18 wherein the silicon compound is a silicone resin consisting essentially of the reaction product of a polymethylhydrogensiloxane and a trimethylsilylated silica resin bearing silicon-bonded hydroxy radicals and the weight ratio of said silicone to said organic polymer has a value of from 5/100 to 25/100.

21. A silicone-organic polymer composition according to claim 17 wherein the organic polymer is selected from the group consisting of polyacrylate, poly (vinyl alcohol) and polyurethane compositions.

22. A silicone-organic polymer composition according to claim 18 wherein the organic polymer is selected from the group consisting of polyacrylate, poly (vinyl alcohol) and polyurethane compositions.

23. A silicone-organic polymer composition according to claim 19 wherein the organic polymer is selected from the group consisting of polyacrylate, poly (vinyl alcohol) and polyurethane compositions.

24. A silicone-organic polymer composition according to claim 20 wherein the organic polymer is selected from the group consisting of polyacrylate, poly (vinyl alcohol) and polyurethane compositions.

* * * * *